D. Ramler.
Horse Rake
No. 23782.  Patented April 26, 1859
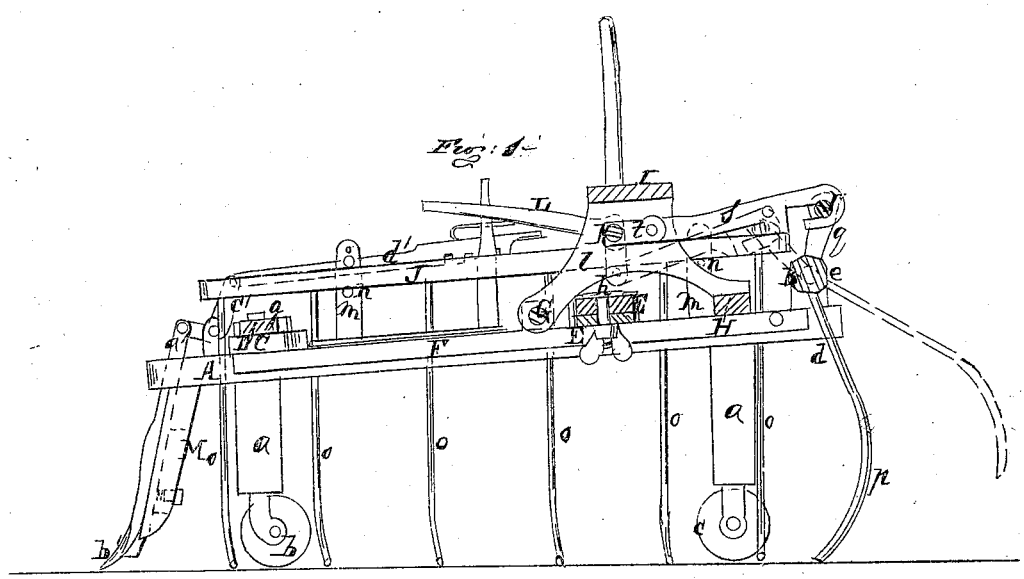
Fig: 1
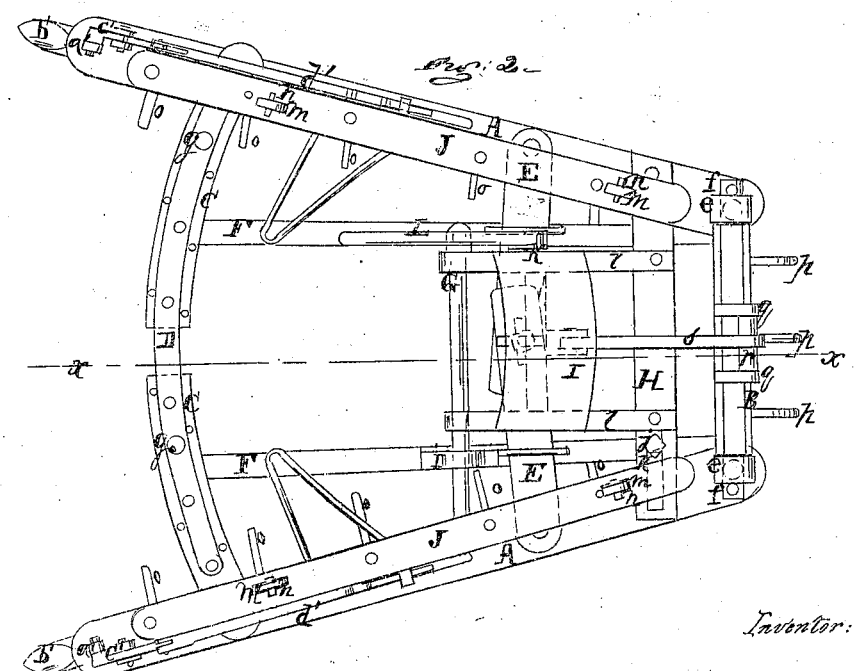
Fig: 2
Witnesses:
Sam Hoffer
John Goss
Inventor:
David Ramler

UNITED STATES PATENT OFFICE.

DAVID RAMLER, OF UNION DEPOSIT, PENNSYLVANIA.

IMPROVEMENT IN MACHINES FOR RAKING HAY.

Specification forming part of Letters Patent No. 23,782, dated April 26, 1859.

*To all whom it may concern:*

Be it known that I, DAVID RAMLER, of Union Deposit, in the county of Dauphin and State of Pennsylvania, have invented a new and useful Hay-Raking Device for Raking by Horse-Power; and I do hereby declare that the following is a full, clear, and exact description of the same, reference being had to the annexed drawings, making a part of this specification, in which—

Figure 1 is a side sectional view of my invention, taken in the line $x\,x$, Fig. 2. Fig. 2 is a plan or top view of the same.

Similar letters of reference indicate corresponding parts in the two figures.

The object of this invention is to obtain a horse implement whereby the hay can be raked direct from the spread state in which it was dried or cured into cocks, thereby avoiding the manual labor of "cocking" the hay from windrows, into which the ordinary horse-rakes can only gather it.

To enable those skilled in the art to fully understand and construct my invention, I will proceed to describe it.

A A represent two side bars of the machine, each of which has a pendent bar, $a$, attached to its front and back end. To the front bars, $a$, swivel or caster wheels $b$ are attached, and permanent wheels $c$ attached to the back bars. The side bars, A A, are slightly inclined, the front ends being the lowest, as shown clearly in Fig. 1. The back ends of the bars A A are fitted loosely on the pintles $d$ of bearings $e\,e$, which receive the journals $f$ of a shaft, B, which, while being allowed to turn freely in its bearings, still connects the back parts of the bars A A. To the front part of each bar A a segment-bar, C, is attached, and on these segments a curved bar, D, is placed and secured to the segments by bolts $g\,g$. Similar bars, E E, are also attached to the bars A A, near their back ends, the bars E E overlapping each other, and having a bolt, $h$, passing through them.

To the under side of each segment-bar C the front end of a reach, F, is attached. The back ends of these reaches are secured to the back parts of the side bars, A A. To one of the reaches F a cross-piece, G, is attached, said cross-piece passing through a bearing, $i$, attached to the other reach. (See Fig. 2.)

To one of the side bars, A, near its back end, a cross-bar, H, is attached, said bar resting on the opposite side bar, A, and being secured to the adjoining reach F by a bolt, $j$, which passes through an oblong slot, $k$, in the bar H, as shown clearly in Fig. 2. The bar H and cross-piece G are parallel with each other, and they form bearings for the side pieces, $l\,l$, of the driver's seat I.

To the upper surface of each side bar, A A, two standards, $m\,m$, are attached, one near each end, and the standards of each side bar pass through a bar, J. The bars J are allowed to slide freely on the standards $m\,m$, and they may be secured at any desired height on the standards by pins $n$. The bars J are rake-heads, and are provided with teeth $o$, of slightly-curved form, that extend to the ground when the machine is in operation. The shaft B is also a rake-head, and is provided with similar teeth, $p$.

To the shaft B two arms, $q\,q$, are attached at right angles, and connected at their ends by a rod, $r$, to which a connecting-rod, $s$, is attached. This rod $s$ is connected to an arm, $t$, on a shaft, K, below the seat I, said shaft having a lever, L, attached to one end of it.

To the front end of each side bar, A, an inclined guide, M, is attached, in which guide the rods $a'$ of dividers $b'$ are attached. These dividers are simply shovel-shaped blades extending to the ground when the implement is in use, in order to divide or separate the edges of the swath and throw the hay at the front ends of the bars A within the path of the movement of said bars. The upper ends of the rods $a'$ are attached to bent levers $c'$, to which rods $d'$ are attached, one to each.

The operation is as follows: The horse is placed between the reaches F F, behind the bar D, and properly attached to the implement, and the side bars, A A, are adjusted more or less obliquely with each other, so that a requisite quantity of hay may be gathered within the rakes, the bars A being adjusted according to the yield or crop. The bars or rake-heads J are so adjusted that the teeth $o$ may touch the ground, and so also are the dividers $b'$, the latter being adjusted by actuating the rods $a'$. As the implement is drawn along the hay between the front ends of the bars A is gathered between the teeth $o$ of the two rake-heads, and is collected in the hollow of the teeth $p$ at the back part of the implement. When a sufficient quantity is thus collected the driver, from his seat I, raises the lever L, and thereby raises the teeth $p$, as shown in red, Fig. 1, and the hay is left in a "cock" behind the implement, the teeth $p$ immediately falling as they leave the gathered hay, the movement of the implement still continued, and the operation repeated.

Thus it will be seen that a great saving of labor is effected by my invention, all manual labor in raking being dispensed with. When the implement is to be moved from place to place the teeth $o$ are raised above the ground, and also the teeth $p$ and dividers $b'$.

Having thus described my invention, what I claim as new, and desire to secure by Letters Patent, is—

The adjustable side bars, A A, provided with the rake-heads J J and teeth $o$, in connection with the rake-head or shaft B, provided with teeth $p$, the above parts being arranged and combined substantially as shown, and used with or without the dividers $b'$, to operate as and for the purpose set forth.

DAVID RAMLER.

Witnesses:
SAM HOFFER,
JOHN GOSS.